United States Patent
Ono (10) Patent No.: US 6,711,592 B2
(45) Date of Patent: Mar. 23, 2004

(54) INFORMATION PROCESSING SYSTEM

(75) Inventor: Masayuki Ono, Kanagawa (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 318 days.

(21) Appl. No.: 09/871,654

(22) Filed: Jun. 4, 2001

(65) Prior Publication Data

US 2001/0056524 A1 Dec. 27, 2001

(30) Foreign Application Priority Data

Jun. 27, 2000 (JP) ........................................ 2000-192001

(51) Int. Cl.$^7$ .............................................. G06F 13/00
(52) U.S. Cl. ...................... 707/204; 707/201; 709/203; 711/162; 714/6
(58) Field of Search ................. 707/201–204; 709/201–203; 711/162; 714/6–7

(56) References Cited

U.S. PATENT DOCUMENTS

| | | | | |
|---|---|---|---|---|
| 5,133,065 A | * | 7/1992 | Cheffetz et al. ................ | 714/2 |
| 5,778,395 A | * | 7/1998 | Whiting et al. ............. | 707/204 |
| 5,854,754 A | * | 12/1998 | Cabrera et al. ................ | 703/2 |
| 2002/0156965 A1 | * | 10/2002 | Gusler et al. ............... | 711/100 |
| 2002/0184376 A1 | * | 12/2002 | Sternagle .................... | 709/230 |

FOREIGN PATENT DOCUMENTS

| | | |
|---|---|---|
| JP | 10-161916 | 6/1998 |
| JP | 10-161922 | 6/1998 |
| JP | 11-234270 | 8/1999 |
| JP | 11-249874 | 9/1999 |

* cited by examiner

*Primary Examiner*—Hong Kim
(74) *Attorney, Agent, or Firm*—Rabin & Berdo, P.C.

(57) ABSTRACT

Information processing system is provided which includes at least two information processing devices connected through a communication network so as to be communicated with each other for transmission of data so that both devices can have information data showing the same contents and each having a memory to store the data.

The data in each of memories is constructed of unit data split into a predetermined unit. The data is of a hierarchical tree structure in which the data to be replicated exists in a lowest layer and each of nodes in the tree structure is expressed by tags. To the tag are added identifying information and time information. Each of the above devices has replication control section adapted, by using the identifying and time information, to detect inconsistent portions of the information and to replicate only the inconsistent portions between the devices.

12 Claims, 6 Drawing Sheets

INFORMATION PROCESSING SYSTEM

BACKGROUND OF THE INVENTION

1. Field of the Invention

The present invention relates to an information processing system including, at least, two information processing devices connectable to each other on a computer network and more particularly to the information processing system including the two information processing devices each storing information represented in a tagged language and performing replication of the information between them so that the two information processing devices are able to have the same information

2. Description of the Related Art

Conventionally, when information is to be replicated among a plurality of servers, in general, one server going to transmit the information first converts a format of the information to be replicated into a format that can be understood by the other server going to receive the information by using replicating functions stored in a database possessed by each of the servers and then transmits the information to the other server going to receive the information. The other server having received the information whose format has been converted then replicates the received information.

However, in the above conventional replicating method, when the replication of information is performed among servers possessed by different industries so that the same information can be held among them, if there is a difference in configurations of the database among servers operated by the different industries or if there is a difference in methods of defining information stored in the database by servers of the different industries, one server having information to be replicated has to re-define, in advance, a format of the information to be replicated so that the format is acceptable to an interface of the other server going to receive the information and then has to feed the information whose format has been re-defined to the other server going to receive the information.

Since a mobile device such as a notebook-sized personal computer and/or an electronic organizer generally has a limited capacity of processing information and holds only small amounts of information, it is not easy to provide the mobile device with existing functions of the database having a sufficient information processing capacity and large storage capacity. Moreover, unless the mobile device is connected to the server, it cannot use information provided by the database in real time.

When the replication is performed among servers each having its own database, each of the servers can use the functions stored in the database and it is easy for each server to make a complete replica within a predetermined range for replication. However, in the case of the mobile device, the range of replicating information and/or time of renewing the information are changed arbitrarily; for example, a user of the mobile device changes at any time information such as a scheduled date in the electronic organizer. Thus, it is difficult to apply such functions of the database as described above to such use of the mobile device.

Following conventional examples in a technical field described above have been disclosed.

(1) Japanese Patent Application Laid-open No. Hei 11-234270 entitled "Methods for replicating and renewing database between networks". In the methods described in this conventional technology, (existing) functions of converting information and of replicating information provided by databases are utilized.

In the above conventional methods, when information is exchanged between different databases through the Internet, a format of the information to be transmitted is converted, by using the database of the server going to transmit the information, into a format of the information in accordance with an encryption protocol contained in the database of the server going to receive the information and the converted information is transmitted from a proxy server going to transmit the information to a proxy server going to receive the information. However, if the server going to transmit the information has not used the protocol contained in the database of the server going to receive the information, every time the server going to transmit the information transmits the information, it has to prepare a new program that can be used in the protocol contained in the database of the server going to receive the information.

(2) Japanese Patent Application Laid-open No. Hei 11-249874 entitled "Computer system, synchronization processing method in the computer system and storage medium". In a client/server system disclosed in this example, in order for a server and a client to be able to use information not only in a state where the server and the client are connected to each other but also in a state they are not connected to each other, the system is so configured that each of the server and the client can supply replicated data maintaining conformity in contents. In general, in the client/server system, there are some cases where data is changed by either or both of the server and the client while the client and the server are not in sync with each other, that is, while they are not connected to each other. To solve this problem, in the disclosed example, in order to maintain the conformity in the replicated data between the server and the client, the replication is performed in a manner that a list of synchronization describing processing of the synchronization of the data possessed by the server is provided on the server side and a list of a replica which is the replicated list of the synchronization processing performed by the server is provided on the client side and these lists are exchanged between them. The disclosed patent application has proposed the method described above together with the use of an interface for mobile devices, however, it does not describe any concrete method of the replication that can be applied to mobile devices.

(3) Japanese Patent Application Laid-open No. Hei 10-161922 entitled "Definition method of replica type". In the disclosed replication method, in order to shorten time of condition judgment required for designating conditions for replication range of a database system, a "replica type" is used. That is, instances of the same type contained in an object-oriented database are grouped by the replica type. By using the replica type, it is possible to perform, at high speed, the selection of instances to be replicated and the judgment as to whether the production of selected instances is allowed or not. However, the above method of grouping by the replica type can be used for only data which can be represented by an object and therefore this method is effective only in the case of production of replicas of information in the object-oriented database.

(4) Japanese Patent Application Laid-open No. Hei 10-161916 entitled "Method for detecting contention of data renewing associated with replication of database". In the disclosed method for the detection, an identifier is given to each data being a processing unit for renewing data in database and the number of times of data renewing is stored as renewing serial numbers in renewing serial number history data. When information is renewed for replication, whether the contention of renewing occurs or not is judged by comparing renewing serial numbers stored in the renewing serial number history data for replication transferred from the database of the server having the information to be replicated with that of data possessed in the database of the server going to replicate the information. That is, checking on the contention of renewing is controlled by using the renewing serial number.

In a WAN (Wide Area Network) system where a mobile device is operated as a client, it is required that, even when the mobile device is not connected to the network, the mobile device, by having a replica of a partial set of the information provided from the server, can handle the information.

Moreover, in the WAN in which, for example, a server of a head office is connected to a server of a branch office for communication, since it is costly to keep each of the servers connected to the network at all times, it is required that each server can be connected to the network only when the communication are necessary.

SUMMARY OF THE INVENTION

In view of the above, it is an object of the present invention to provide an information processing system made up of a plurality of information processing devices each having information data represented in the same language with tags and each being capable of performing, by giving an attribute indicating an identity and an attribute indicating a time stamp to a tag corresponding to a minimum information unit making up the information data, replication of only non-conformity portion of the information data at a time of replication of information for renewing information among the information processing devices.

It is another object of the present invention to provide the information processing system made up of a plurality of information processing devices each being capable of handling each piece of information in a set unit by giving a set attribute to the minimum unit information and being capable of replicating information designated by the set unit and being most suitably used in a system including mobile devices in particular.

According to a first aspect of the present invention, there is provided a information processing system including:

at least two information processing devices being connected through a communication network so as to be communicated with each other in order to enable data transfer so that both of the information processing devices hold information data containing the same content, and each having a memory used to store the information data; and wherein the data stored in the memory is made up of unit data being split into a predetermined unit and the data is of a hierarchical tree structure in which nodes are expressed by tags and wherein each of the nodes existing in a lowest layer in the hierarchical tree structure corresponds to each piece of the unit data and to each of the tags expressing each of the nodes in the lowest layer are added identifying information used to identify each piece of the unit data and time information indicating a time of storing each piece of the unit data into the memory, and wherein each of the information processing devices includes a replication control unit which, by using the identifying information and the time information, detects inconsistent portion of the data held by each of the information processing devices and performs replication of the inconsistent portion of the data only between the information processing devices.

In the foregoing, a preferable mode is one wherein the identifying information has an identification code used to identify each of the information processing devices.

A preferable mode is one wherein at least one of the plurality of information processing devices is a server and at least one of the plurality of information processing devices except the server is a mobile device being a client and wherein the replication of information is performed between the server and the mobile device.

Also, a preferable mode is one wherein the network is a WAN (Wide Area Network).

Also, a preferable mode is one wherein the mobile device, by using the identifying code fed from the server through the network and used to identify the mobile device, is able to produce new identifying information even while the mobile device is not being connected to the network.

Also, a preferable mode is one wherein each of the information processing devices is a server operating on the network.

Also, a preferable mode is one wherein the time information is made up of a synchronized time attribute indicating a time of completion of the replication of information between the information processing devices and of a changed time attribute indicating an updated time of storing each piece of the unit data into the memory.

Also, a preferable mode is one wherein a set attribute indicating a set to which each piece of the unit data belongs is added to the tag of the node in the lowest layer.

Also, a preferable mode is one wherein each of the information processing devices is able to designate a predetermined group of unit data using the set attribute.

Also, a preferable mode is one wherein a priority attribute showing information about priority as to whether the unit data to be updated is to be overwritten with unit data to be replicated at time of the replication is added to the tag of the node in the lowest layer.

Also, a preferable mode is one wherein one of the information processing devices storing the unit data to be updated judges, when the changed time attribute given to the tag corresponding to the unit data to be updated shows a time being newer than a time shown by the synchronized time attribute given to the tag at a time of the replication, whether the unit data to be updated is to be overwritten by the unit data to be replicated on the basis of the priority attribute given to each of the both unit data.

Furthermore, a preferable mode is one wherein, when the unit data to be updated has not been overwritten with the unit data to be replicated according to the judgment based on the priority attribute, an event notification showing that the replication between the information processing devices has become invalid is issued to the information processing device storing the unit data to be replicated.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

Figure 1:
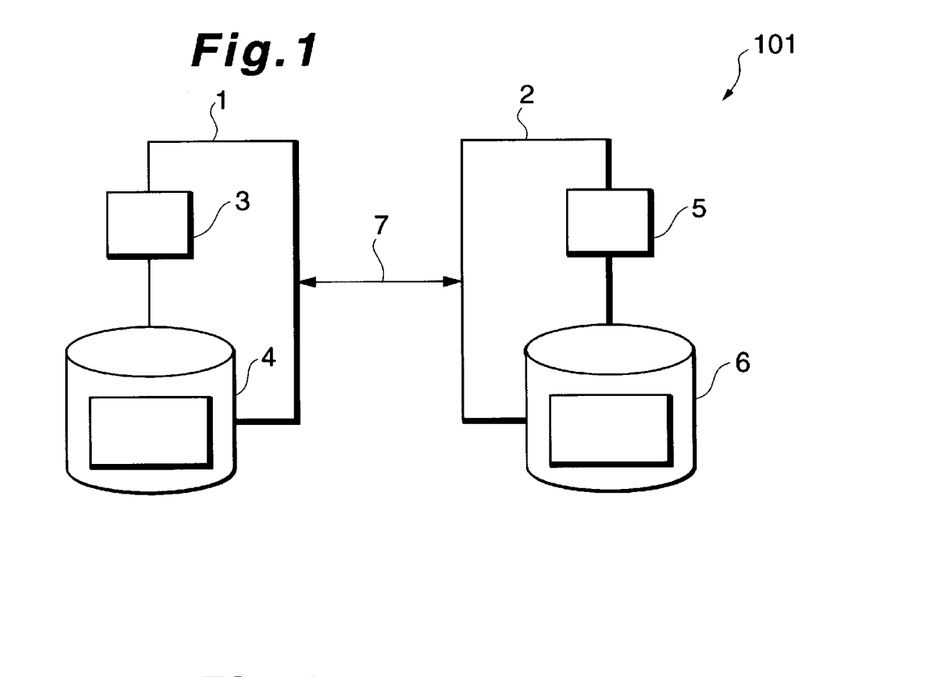
FIG. 1 is a schematic block diagram showing configurations of an information processing system according to a first embodiment of the present invention.

In an information processing system of a first embodiment, as shown in FIG. 1, a server 1 is connected to a server 2 through a network 7 in a manner so as to be communicated with each other.

The server 1 (first server) and the server 2 (second server) are placed so as to be connectable to each other on the network 7 and each of the two servers performs replication of information data possessed by each of them so that each of the two servers can have information data with the same contents in a predetermined range that can be replicated through the network. By having the same data for the replication, the server 1 is in sync of information data with the server 2. The information data replicated between the servers 1 and 2 is represented in the same language with tags and the replicated data is stored in storage units (memory devices) 4 and 6 each being locally connected to the servers 1 and 2, as described later.

As the network system 7 to which the servers 1 and 2 are connectable for communication, for example, the Internet can be used. Moreover, as another network to which the servers 1 and 2 are connectable, an Intranet is also usable, which can provide a closed communication environment.

The server 1 is provided with a replication control section 3. Similarly, the server 2 is provided with a replication control section 5. Both the replication control sections 3 and 5 exert control on the replication of the information in cooperation with each other. The server 1 has the storage unit 4 (memory device) used to store data including information to be replicated. The server 2 also has the storage unit 6 with the same function as that of the storage unit 4 of the server 1.

Each of the servers 1 and 2, using a mechanism for setting a watch, ticks substantially the same internal time. In the information processing system 101, when one server receives replicated data from another server, the server going to receive the data produces a code to be given to the received data, which is used to identify which server has transmitted the replicated data. One server going to transmit the data which have received the identifying code, when transmitting the replicated data to another server going to receive the data, gives identifying information including the code to the replicated data and the server going to receive the replicated data can judge which server has transmitted the data, based on the code attached to the replicated data. In the example, the identifying code is produced in the form of a seed for an identity for each communication session and a value of the produced seed for the identity remains effective until new communication sessions are started between the both servers. The identifying information including the seed for the identity is provided to data to be newly produced as information for indicating the identity to be inherited to the newly produced data. The seed for the identity is produced by either of the servers 1 or 2 which is going to receive replicated data and is supplied to either of the servers 1 or 2 which is going to transmit the replicated data. In the following description, let it be assumed that the server 1 is a server having a function of producing the seed for the identity, that is, the server going to receive replicated data.

Each piece of the information data possessed by each of the servers 1 and 2 is represented in the same language with tags and the information about the identity, synchronized time, changed time and set attributes are added to the minimum unit information obtained by splitting the information data into predetermined units of portions.

Next, operations of the information processing system 101 of the first embodiment will be described below.

Figure 2:
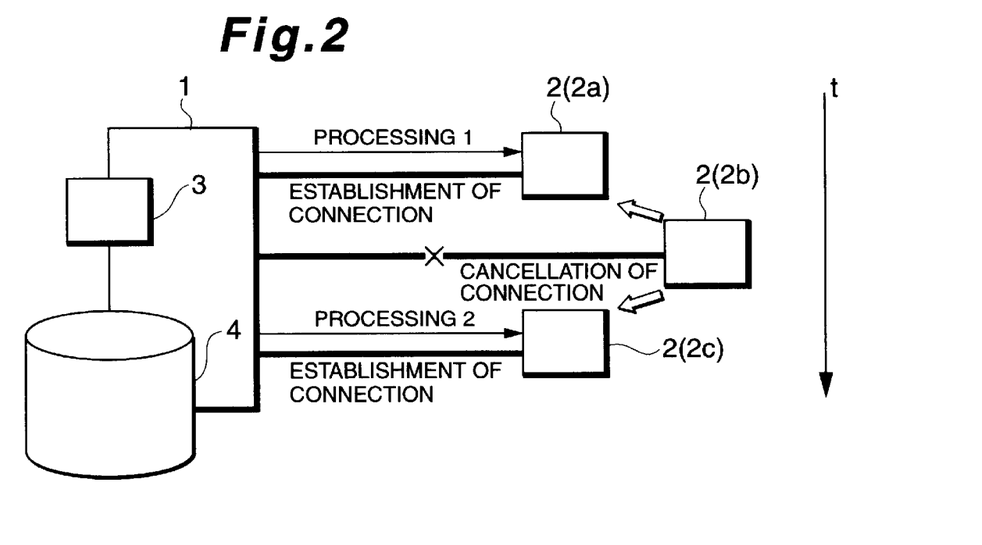
FIG. 2 is a diagram illustrating procedures for obtaining the seed indicating identity employed in the information processing system according to the first embodiment of the present invention.

FIG. 2 is a diagram illustrating procedures for obtaining the seed for the identity used in the information processing system according to the first embodiment. In FIG. 2, procedures by which the server 2 obtains the seed for the identity from the server 1 are shown in order of a lapse of time "t" indicated by the arrow. The servers 2a, 2b and 2c show states of the server 2 to be changed by the lapse of time. As described above, the server 2 is the server going to produce the replicated data and the server 1 is the server going to receive the replicated data.

When data is newly produced, the identity, which is used to uniquely identify each of minimum unit information obtained by splitting the newly produced data into a predetermined unit of portions, is given to each of the minimum unit information. Each piece of the identity can use serial numbers by using a value represented by the seed for the identity produced for each session, as an initial value. Procedures for giving the identity will be described below by referring to FIG. 2.

The server 2, after having made a connection to the server 1, by making a request for the seed for the identity to the server 1, obtains the seeds in processing 1 (first processing). The server 2, when obtaining the seed for the identity, stores the connection session with the server 1 and, while the session is continued, produces, in advance, a predetermined number of the identities based on the obtained seeds. The server 2, when the session is discontinued, provides each of the identities to new minimum unit information which is produced during a period of the subsequent disconnection. The server 2, when being connected again to the server 1, makes the request for a new seed for the identity required after the disconnection of the session and obtains the new seed in processing 2 (second processing).

The server 1, when having received the request for the seed for the identity from the client (the server 2), feeds codes that contains a value to be used as an initial value within a specified range of values and is used specifically at every session for the replication, as the seed for the identity to the client.

As described above, since each of the identities uses a serial number using the seed for the identity as the initial value, each identity becomes a specific value on the network.

When new information is produced, the identity is provided to each unit of the information and the provided identity continues to exist so long as the minimum unit information exists without being deleted.

Figure 3:
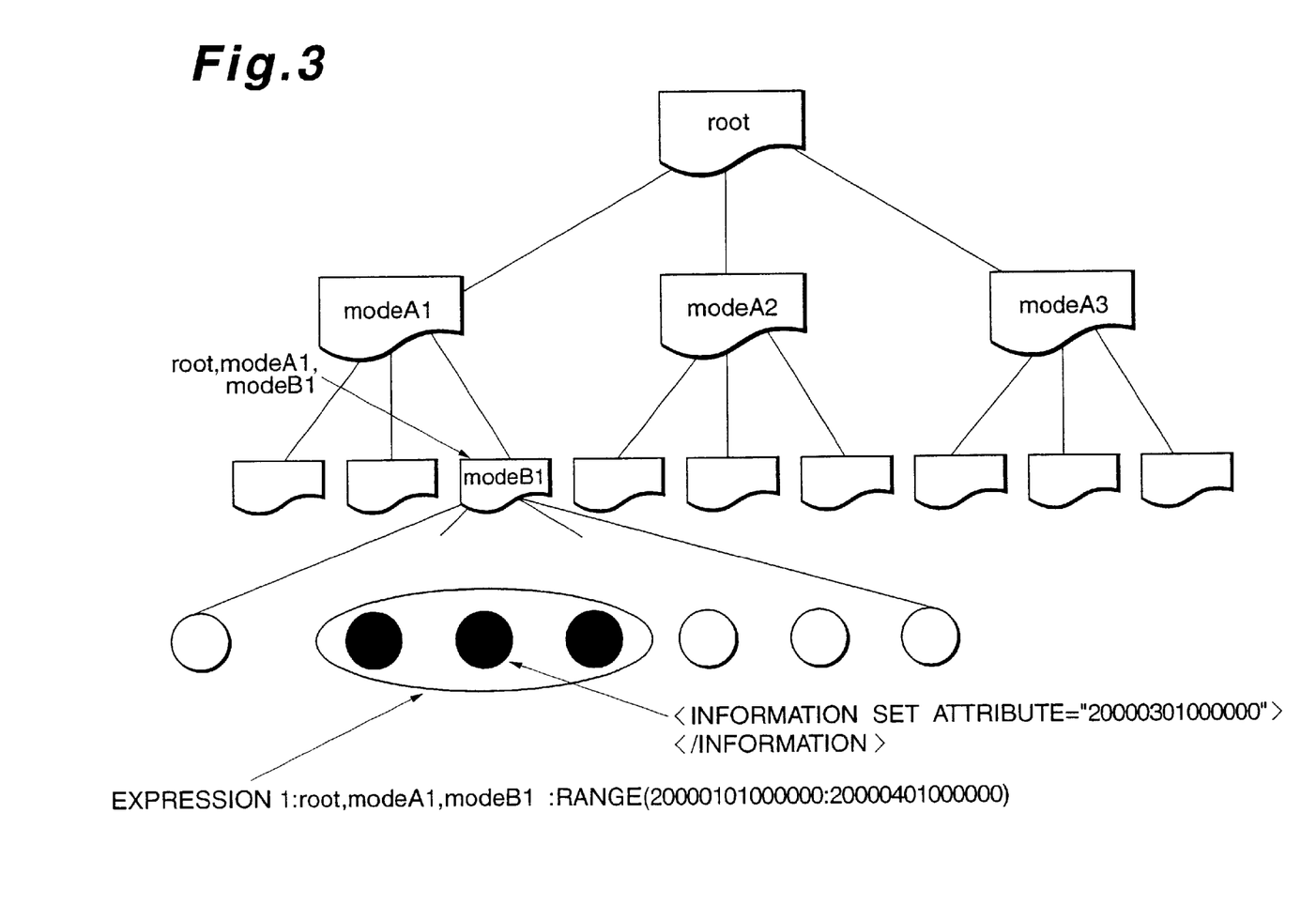
FIG. 3 is a diagram showing configurations of information data represented in a tagged language employed in the information processing system according to the first embodiment of the present invention.

In FIG. 3, a method is shown for designating a range of information to be replicated which has been represented in the tagged language in the information processing system 101 of the present invention. The method for designating the range of the information to be replicated will be described below.

When the tagged language such as an XML (Extensive Markup Language) or an HTML (Hyper Text Markup Language) is used, information is expressed in a form of a hierarchical tree structure in which the minimum unit information to be replicated exists in a lowest layer. Each of nodes in the tree structure is expressed by each of the tags which can represent a layer in which each node exists. For example, in the XML, an element is provided with tags made up of a start tag and an end tag and with an entity located between the start tag and the end tag. An entity name to which the entity belongs is given to each of the start and end tags. Moreover, when necessary, to the start tag is added an attribute showing complementary information about the entity. In the XML, by inserting one element between the start tag and end tag of another element, the hierarchical tree structure can be expressed. To each of the tags corresponding to each unit of the information is added, in addition of the identity, information showing a set including time and quantity related to the unit information as set attributes. Values representing the time and quantity related to the unit information are assigned appropriately as the set attribute values. In the information processing system 101, selective designation of the unit information to be replicated is made possible by designating positional information about which layer of the hierarchical tree structure a desired unit of the information exist in and by designating a range of values that can be taken by the related to the unit information to be replicated, as described later.

The information represented in the tagged language, as described above, is of a hierarchical structure. The tag of a node is designated in order from an uppermost layer, that is, each of nodes included in the hierarchical structure is designated sequentially from high layers. By the designation in the hierarchical order, a position of the minimum unit information having a time information attribute described later is indicated.

For example, the expression "root, nodeA1 and nodeB1" shown in FIG. 3 means that the position of the minimum unit information is designated by a lower layer of the node B1 being a lower layer of a node A1 which is also a lower layer of a root in the tree structure of the data. In the information processing system 101, when the designation of a plurality of the unit information in the hierarchical order is performed, two or more ranges each having overlapped portions can be designated, in which an OR set (sum set) made up of these two or more ranges becomes a range of the information to be replicated.

To a value of the set attribute is assigned an original value that the minimum unit information possesses. The value of the set attribute is allowed to be determined freely by an application using the present invention. That is, let it be assumed, for example, that "date" is defined as the set attribute of the information data regarding a schedule. In this case, if the schedule for "March 1" is described on "February 14", the original data is not the date on which the schedule is produced (February 14) but the data on which the schedule is executed (March 1). As a result, as the value of the set attribute, "March 1" is assigned.

In the information processing system 101, as described above, when the unit information to be replicated is designated, both information about a position where the minimum unit information exists and a range of values that can be taken by set attributes that has been provided to the minimum unit information to be replicated are designated. This allows a range of information to be replicated to be designated. As an example, when information encircled by an ellipse shown in FIG. 3 is to be replicated, the range of information to be replicated is designated by using the Expression 1. The desired range of information to be replicated can be appropriately set by both the servers 1 and 2.

When unit information not belonging to the information indicated by the set attribute exists in the minimum unit information, a coefficient indicating that it has nothing to do with the minimum unit information can be given to the unit information. In the information processing system 101, two kinds of the coefficients are used; one being a value (true) indicating that, even if the unit information is not related to the set attribute, the unit information is replicated, and another being a value (false) indicating that the unit information is not replicated. The minimum unit information having the "true" value is always information to be replicated.

In the information processing system 101 of the present invention, the range of the information designated by the above procedures for designating the range of the information to be replicated is replicated.

Figure 4:
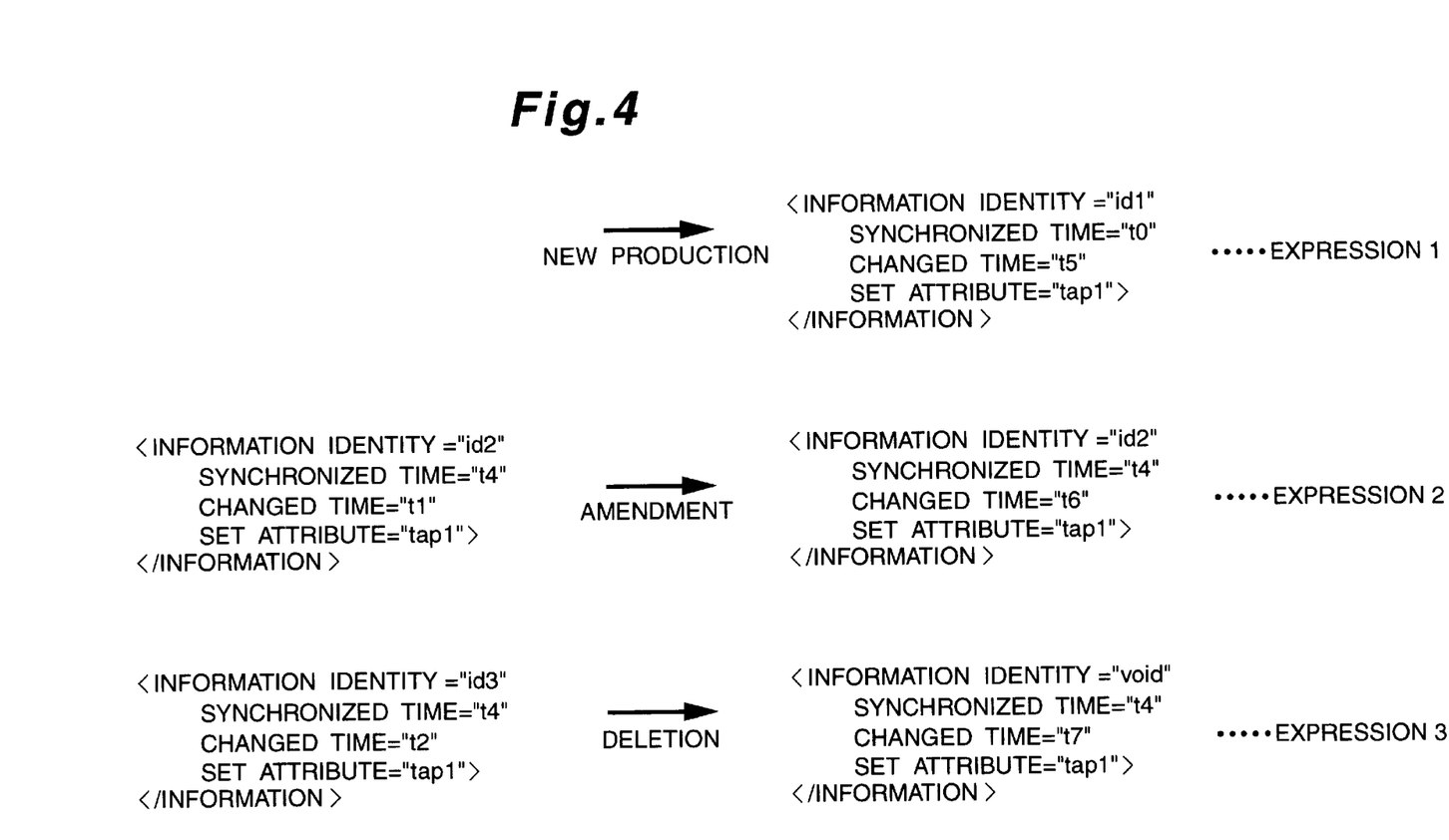
FIG. 4 is a diagram explaining new addition, amendment and deletion of a minimum unit information used in the information processing system according to the first embodiment of the present invention.

In FIG. 4, how the attribute values added to the tag of each unit of the information are changed by new addition, amendment and deletion of the unit information which are performed in each of the servers at a time other than at the replication.

Procedures for setting the attribute values will be described below.

When the information is produced, as shown in Expression 1, the identity, set attribute, synchronized time and changed time are added to the tag corresponding to each unit of the information. As described by referring to FIG. 2, as the identity, a value that can specify the information in the WAN is employed.

The set attributes are added in accordance with a rule applied in the WAN in which the information replicating function is used. As a value of the synchronized time, a time of completion of the replication performed between the servers 1 and 2 is stored. In Expressions 2 and 3 shown in FIG. 4, "t4" is assigned as the synchronized time. Moreover, when the minimum unit information is newly produced, an initial value is given as the synchronized time. In the Expression 1 shown in FIG. 4, "t0" is assigned as the initial value of the synchronized time. As the changed time, a time when the unit information is newly produced or when new information is stored in each of the servers such a case when the unit information is renewed by being overwritten is assigned.

When the minimum unit information is renewed, as shown by Expression 2 in FIG. 4, the value of the changed time is renewed to be a new time ("t6") when the change is actually made. In some cases, the set attributes are changed in accordance with the rule being applied on the network being used. To delete the minimum unit information, instead of the deletion of a real entity of the information, a flag indicating virtual deletion of the information can be set at the time of the synchronization. At this time, as shown by Expression 3 in FIG. 4, the changed time is renewed to be a present time, that is, the time when the flag has been set. If the time indicated by the value of the changed time is newer than the time indicated by the value of the synchronized time, it means that the minimum unit information has been renewed by the server after the previous replication of information performed between the two servers.

Figure 5:
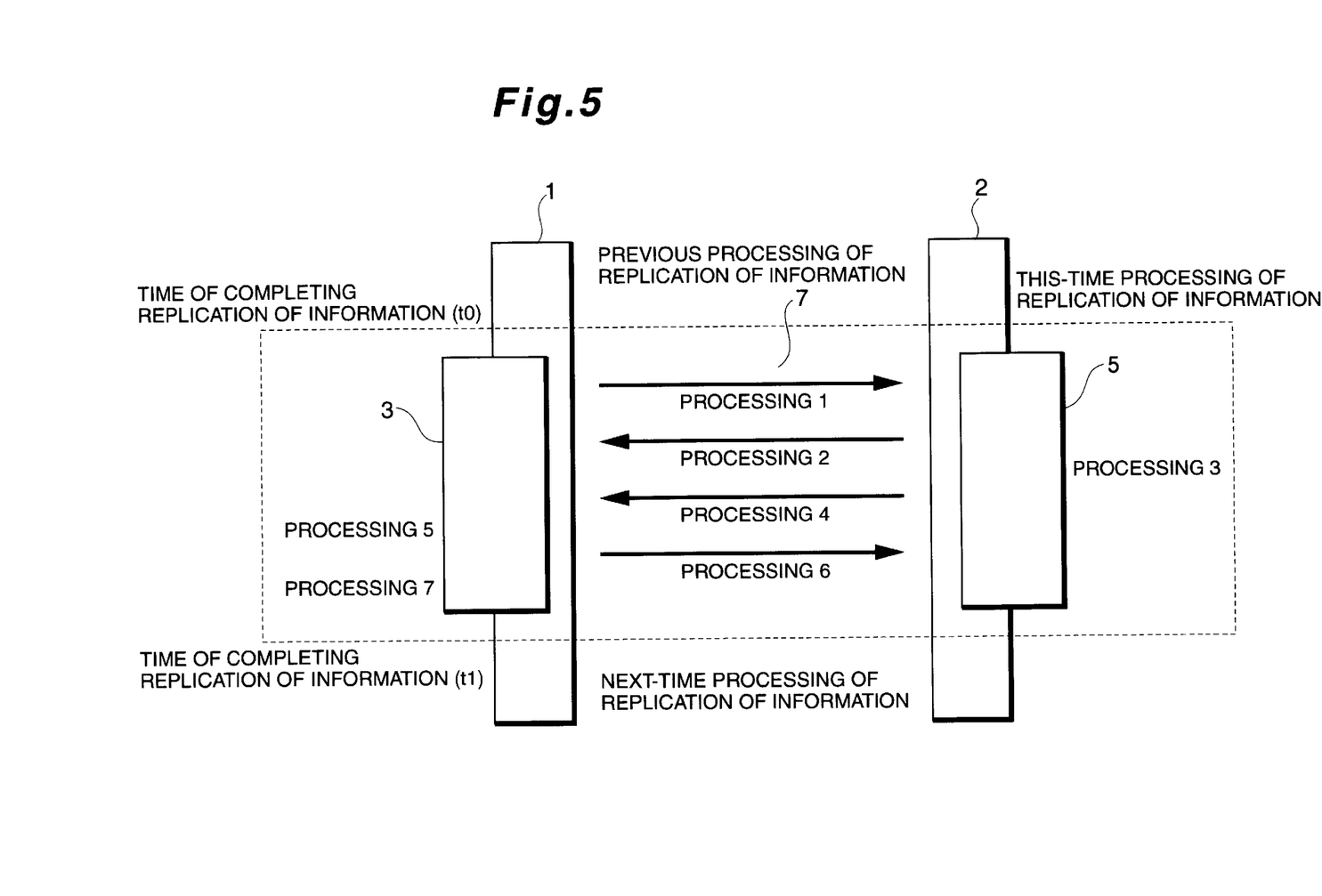
FIG. 5 is a diagram showing procedures for replicating information between one server and another server in the information processing system according to the first embodiment of the present invention.

FIG. 5 shows a flow of the replication of information from the server 2 to the server 1. FIG. 6 is a flowchart showing the procedures for the replication.

Methods for replicating information data of the embodiment of the present invention will be hereafter described.

Both the replication control section 3 of the server 1 and the replication control section 5 of the server 2, every time the replication of the information between the servers 1 and 2 has completed properly, store the time of the completion of the replication of information.

The replication control section 5 of the server 2, when having established a connection to the server 1, obtains the seed of the identity from the replication control section 3 of the server 1 (Processing 1 in FIG. 5, Step S1 in FIG. 6 (A)).

Next, the replication control section 5 of the server 2 inquires of the replication control section 3 of the server 1 about a range of information to be replicated defined by the server 1 and a newest time of completion of replicating the information.

The server 2, after having obtained a reply for the inquiry from the server 1, if a value for completion of the newest replication of information being controlled by the replication control section 5 of the server 2 is equal to the value for completion of the newest replication of information obtained from the replication control section 3 of the server 1, judges that the newest replication of information between the two servers 1 and 2 has properly completed.

The server 2, when having judged that the newest replication of information between both the servers 1 and 2 has completed properly, in order to check whether unit information operated after the newest replication of information has completed in the server 1 exists in the unit information in a range of information to be replicated in the server 2, compares the value for the completion of information fed from the server 1 with that for the changed time possessed by the unit information in the range of information to be replicated in the server 2 (Processing 2 and 3 in FIG. 5 and Step S2 and S3 in FIG. 6 (A)). The server 2 further compares the range of information to be replicated fed from the server 1 with the range of information to be replicated defined by the server 2 and checks whether there is inconsistency in the tree structure within the range of information to be replicated (Step S4 in FIG. 6). This checking is performed by using the tag. When there is consistency in the tree structure within the range of information to be replicated fed from the server 1, that is, there is no change in the tree structure within the range of information to be replicated fed from the server 1, the server 2, in accordance with the result of the comparison performed in Steps S2 and S3, extracts unit information in which the value of changed time is newer than the value for completion of the replication fed from the server 1 and draws up a list as a list showing the related changes (Step S5 in FIG. 6).

Figure 6A:
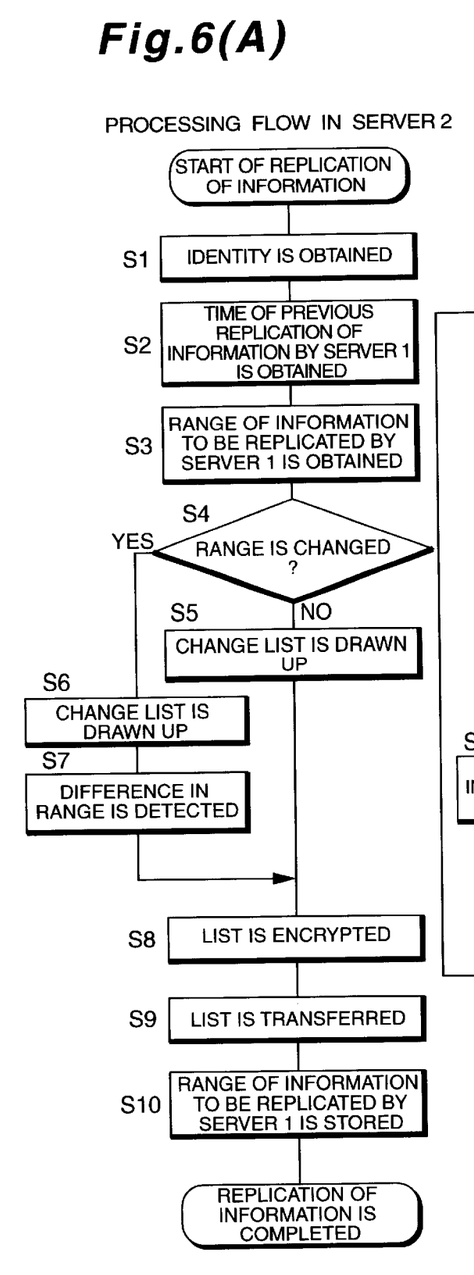
FIG. 6 is a flowchart showing procedures for the replication of the information between the two servers in the information processing system according to the first embodiment of the present invention.

Moreover, if there is a change in the range of information to be replicated fed from the server 1, that is, there is a difference between the tree structure within the range of information to be replicated fed from the server 1 and the tree structure within the corresponding range of information to be replicated held by the server 2, the increase in the range of information to be replicated is detected as the inconsistent portion of the information (Step S6 in FIG. 6(A)). The server 2 draws up a change list including not only unit information corresponding to consistent portions as are contained in the list showing the related changes drawn up in Step S5 but also unit information about the increase in the ranges, detected as the inconsistent portion, being unit information shown by the tag including information about the identity created on a basis of the seed (Step S7 in FIG. 6(A)).

The server 2, after having drawn up the change list and having encrypted information in the list, transfers the list to the replication control section 3 of the server 1 (Processing 4 in FIG. 5 and Steps S8 and S9 in FIG. 6(A)) and stores the range of information to be replicated by the server 1 (Step S10 in FIG. 6(A)).

After it is confirmed that the transfer of the list to the server 1 has surely completed, the replication control section 5 of the server 2 is released from the processing of replication of information. The change list fed from the server 2 is used as renewed information by the server 1.

When the server 1 receives the change list from the server 2 through the network 7, the replication control section 3 of the server 1 decodes information in the list (Step S11 in FIG. 6 (B)). In the server 1, after the information in the list has been decoded, contents of the change list are analyzed (Processing 5 in FIG. 5 and Step S12 in FIG. 6 (B)). As a result, whether unit information to be replicated exists or not in the list is judged (Step S13 in FIG. 6 (B)). When it is judged that no unit information to be replicated exists in the list, the server 1, since there is no need for performing renewal processing of information possessed by the server 1, stores a time of completion of the information replication to terminate the replicating operations with the server 2 (Step S14 in FIG. 6 (B)). On the other hand, if there is unit information to be replicated in the change list fed from the server 2, the server 1 checks, by using the identity contained in the change list, whether there is minimum unit information having the same identity as contained in the change list fed from the server 2 and, if it proves that there is minimum unit information, overwriting of the existing minimum unit information with the minimum unit information having attribute values for changed time is performed. Moreover, the unit information newly produced by the server 2 is stored in the server 1. That is, which value shows the newest time, out of a value of synchronized time or a value of changed time possessed by the unit information of the list is checked for comparison (Step S15 in FIG. 6 (B)). It is judged from this comparison that, the unit information fed from the server 2, if its value of synchronized time is newer than its value of changed time, has not been changed after completion of the previous replication of information between both the servers 1 and 2. This causes the unit information of the server 1 to be renewed by the unit information transferred by the server 2 (Step S18 in FIG. 6 (B)). Thereafter, until all the unit information contained in the list has undergone the replication processing, procedures in Step S12 and afterward are repeated. The server 1, after all the information contained in the list has undergone the replication processing, stores the time of the completion of the replication of information to terminate the replication operations with the server 2 (Step S14 in FIG. 6 (B)). In the unit information contained in the list fed from the server 2, if its value of changed time is newer than its value of synchronized time, it is judged that the unit information contained in the list has been changed in some ways by the server 2 after the previous replication between the two servers and the server 1 judges which unit information should receive priority, out of the unit information possessed by the server 1 or by the server 2.

Figure 6B:
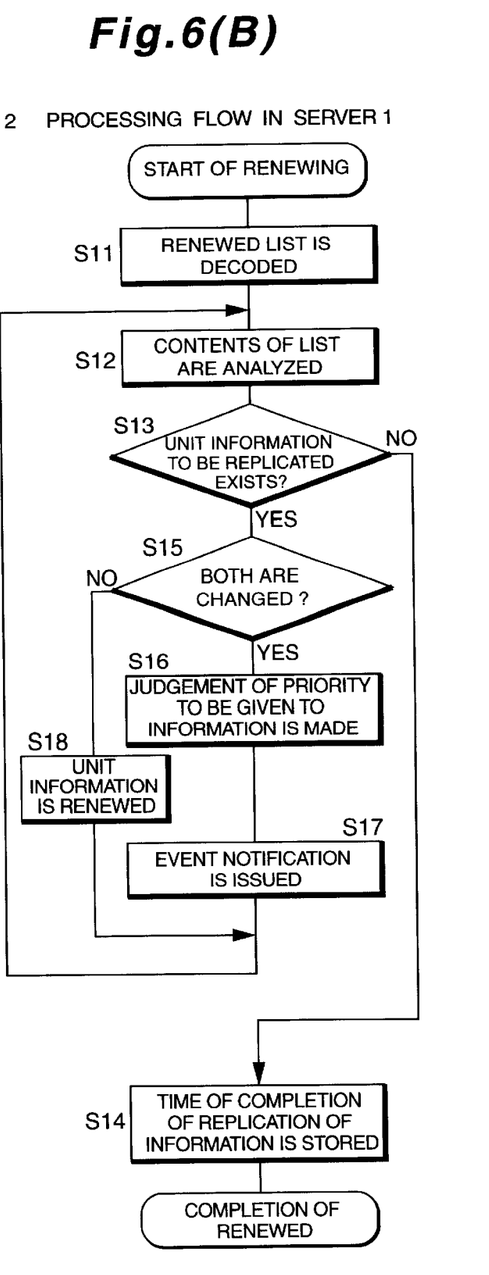

Which information should receive the priority can be determined in accordance with operational rules of applications created by using the present invention. In the information processing system 101, in order to avoid such the contention as described above, it is possible to provide, in advance, a priority attribute to each tag corresponding to each unit information. If the contention occurs in the provided information, the server 1 judges which information should receive the priority based on the priority attribute that has been given to each unit information and, as a result, the information given the priority in accordance with this judgment is used by the server 1 as the newest information (Step S16 in FIG. 6(B)). When unit information contained in the list transferred from the server 2 has not received the priority by the judgment based on the priority attribute, event notification indicating that the priority has not been given is issued by the server 1 to the server 2 (Step S17 in FIG. 6(B)). The replication control section 5 of the server 2, when receiving the event notification, performs predetermined processing in accordance with operational rules of the server 2.

The replication control section 3 of the server 1, after having issued the event notification to the server 2 and having completed all the processing to be carried out by the server 1, stores the time of completion of replicating the information (Processing 7: Step S14 in FIG. 6 (B)). At this point, if renewing operation in the server 1 has not completed normally due to some failures, the time of completion of replicating information on the server 1 side is not updated.

In a next information replicating processing subsequent to the above replication, regardless of whether the above problem has been solved or not, the same replicating processing as described above is performed by using the time of the completion of the replication that has not been updated. If the problem described above has been solved, the server 1 can terminate normally the information replicating processing, however, if it has not been solved, since the server 1 cannot terminate normally the information replicating processing, unless the problem is solved in the server 1, the time of completion of the replication is not updated.

In the above description, the example in which the information possessed by the server 1 is updated by using the change list showing changed information on the server 2 side, however, alternatively, the server 2 can update information by using the information provided by the server 1 in the same manner as described above. This enables bilateral replication of information to be performed between the servers 1 and 2.

As described above, in the information processing system 101 of the first embodiment, the information data possessed by the servers 1 and 2 are represented in the same language with tags and each of the tags corresponding to the minimum unit information contained in the information data is provided with the identity, timestamps, that is, synchronized time and changed time, and set attributes. The fact that information data held by each of the servers is represented in the same language with tags means that, for example, when the XML is used as the tagged language between the two servers, a so-called DTD (Document Type Definition) describing definitions of each of the tags used in the XML is common to the two servers. Therefore, the entity between the start tag and the end tag, that is, an expression format of the minimum unit information can be different, for example, in a manner to have a difference between a text format and a binary format. Moreover, in the information processing system 101, each of the servers 1 and 2, since it can identify the minimum unit of the information, by comparing the minimum unit of the information possessed by each of the servers 1 and 2, can detect only the inconsistent portion of the information. This enables only the inconsistent portion of the information one server to be designated and to be replicated by another server, thus achieving conformity of the information between the two servers.

Furthermore, by the designation of the range of information to be replicated using the set attributes, not only the replication of all information but also the replication of the partial set of the information is made possible. The range of the information to be replicated possessed by both the servers can be dynamically changed.

These functional features are effective in replicating information among databases possessed by different industries or among servers connected through the Internet.

Second Embodiment

An information processing system 102 of a second embodiment will be described below by referring to FIG. 7.

The present invention can be applied to information system using mobile devices on the network. For example, if there are two servers in an information system, while one server is being connected, at all times, to the other server, the one server can browse information possessed by the other server in real time and/or the one server can feed information possessed by itself to the other server in real time. In the mobile devices in particular, it is requested that, the mobile device, even while it is not connected to the server, can use newest information held by the server.

However, as described above, conventionally, the mobile device, unlike the server, has limited information space used to store information or has low processing capability in an CPU (Central Processing Unit) and, therefore, it is impossible for mobile devices to have the same functions as are provided by a database system of the server. That is, exchange of large amounts of information between the mobile device and the server is difficult in the conventional information processing system.

According to the information processing system 102 of the second embodiment of the present invention, even the mobile device is a conventional one, it can use almost the same information as is possessed by the server.

Figure 7:
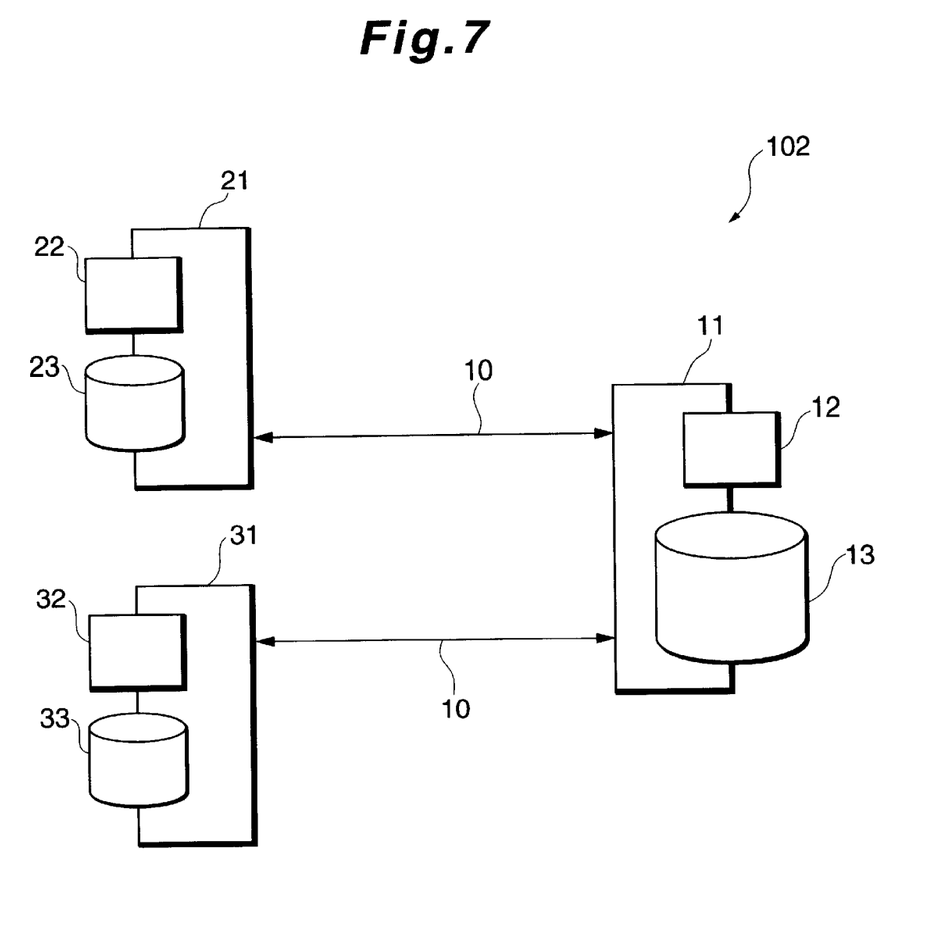
FIG. 7 is a schematic block diagram showing configurations of an information processing system according to a second embodiment of the present invention.

The information processing system 102 of the second embodiment of the present invention, as shown in FIG. 7, chiefly includes a server 11, a mobile device 21 being a client of the server 11 and a mobile device 31 being a client of the server 11.

The server 11 is connected to the mobile devices 21 and 31 through a network system 10 so as to be communicated with each other. The server 11 is provided with a replication control section 12 having the same function as that of the server 1 of the first embodiment and with a storage unit 13 having the same function as that of the server 1. The mobile device 21 is provided with a replication control section 22 having a function being similar to the replication control section 12 of the server 11 and a storage unit 23 used to hold information data including replicated information. The mobile device 31 is provided with a replication control section 32 having the same function as that of the replication control section 22 and a storage unit 33 having the same function as that of the storage unit 23.

The mobile devices 21 and 31 and the server 11, by synchronization processing to be performed when both are connected to each other, can share the same information within a predetermined range. Each of the mobile devices 21 and 31 and the server 11 stores information represented in the same language with tags in each of the storage units 23 and 33. As the network system 10, so long as the mobile devices and the server can use as a method for communication, either of the Internet or an intranet providing a closed environment may be used.

Each of the replication control sections 22 and 23 of the mobile devices controls the replication of information in cooperation with the replication control section 12 of the server 11.

Each of the mobile devices 21 and 31 and the server 11, using a mechanism for setting a watch, ticks substantially the same internal time, as in the case of the information processing system 101.

The server 11 has a function to produce a seed of an identity as in the case of the server 1 of the first embodiment.

The information held by the mobile devices 21 and 31 and the server 11 is represented in a same language with tags and, as in the case of the information processing system 101 of the first embodiment, the identity, synchronized time, changed time and set attributes are added to the minimum unit information to replicated.

In the information processing system 102, a plurality of mobile devices can be clients of the server 11 and the replication of information is always performed between the mobile devices and the server. In this environment, each of the two or more mobile devices is allowed to have information to be replicated in an overlapped range of the information in which case, however, only one mobile device is permitted to add, amend or delete the range of the information to be replicated. Other mobile devices which are not permitted to add, amend or delete the range of the information are allowed to add, amend or delete information held by the other mobile device. Even if the addition, amendment and deletion made by the other mobile devices are attempted to be reflected on the server side, priority is given to the one server having permitted to add, amend or delete, and an event notification indicating that the information about the addition, amendment and deletion made by the other mobile devices is issued to the other mobile devices.

Operations and procedures for processing in the information processing system 102 of the second embodiment will be described below.

Procedures for replication information are the same as those employed in the information processing system 101 of the first embodiment. However, as described above, since the mobile device generally has a limited storage capacity, in the information processing device 102, it is preferable that an amount of data for information to be synchronized is made small.

Thus, in the information processing system 102 of the second embodiment, when the mobile device is connected to the server 11, in order to maintain conformity of the information held by both of them, information needed for the mobile device is fed from the server 11 to the mobile device and information input by the mobile device is fed from the mobile device to the server 11. Since this causes both the mobile device and the server to hold information containing the same contents, even if the mobile device is not always connected to the server 11, the mobile device can use almost the same information held by the server 11.

Moreover, in the information processing system 102, since the data is of a tree structure, it is possible to reduce the amount of data for information to be synchronized. Therefore, even if the storage capacity of the mobile device is small, a system enabling the replication of data to be used for synchronization can be implemented.

These features are effective, in particular, for distributing information to the mobile device in the network system using the mobile device.

The present invention can be applied not only to the applications described above but also applications described below.

In the above embodiments, examples in which the present invention is applied to the replication of information between servers and/or in the WAN using the mobile devices are disclosed, however, the present invention can be applied to any information system in which information is represented in the tagged language.

Especially, information handled by an object-oriented database is represented by the hierarchical structure can be easily converted to tagged-language based information, the object-oriented database can be applied as the system used in the present invention.

As described above, the following effects can be achieved by the present invention.

(A) In the information processing system of the present invention made up of a plurality of information processing devices, since information data held by each of the information processing devices is of the hierarchical structure and is represented in the same language with tags and identifying information, time information and set attribute are added to the tag corresponding to the minimum unit information making up each information data, each of the information processing devices can identify the minimum unit of information and can compare the unit information, thus enabling only inconsistent portion of data to be detected. This enables only the inconsistent information in one information processing device to be designated and this inconsistent information only, in stead of all the information, to be replicated by other information processing system, thus achieving conformity of the information held by each of the information processing devices.

Moreover, by the designation of the range of information to be replicated using the set attribute, it is made possible to handle the information in set unit to which each unit of the information belongs, thus enabling not only the replication of all the information but also the replication of the information designated by the set unit out of all the information. Furthermore, by using the time information, it is possible to change dynamically the range of information to be replicated among the information processing devices. These features are effective in the replication of information among database systems being used by different industries and among servers connected by the Internet.

(B) According the present invention, since only information required for the replication can be handled in the minimum unit, the mobile device, even if its storage and processing capacity generally are smaller than that of the server, can carry out the synchronization with the server. This makes it easier for the mobile device to replicate the information held by the server and for the server to replicate the information input and held by the mobile device, while the mobile device is being connected to the server. Therefore, even if the mobile device is not connected at all the time to the server, the mobile device can use almost the same update information as is held by the server.

These features are effective in distributing information to the mobile devices in the WAN using the mobile devices.

It is apparent that the present invention is not limited to the above embodiments but may be changed and modified without departing from the scope and spirit of the invention.

What is claimed is:

1. An information processing system comprising:
   at least two information processing devices being connected through a communication network so as to be communicated with each other in order to enable data transfer so that both of said information processing devices hold information data containing the same content, and each having a memory used to store said information data; and
   wherein said data stored in said memory is made up of unit data being split into a predetermined unit and said data is of a hierarchical tree structure in which nodes are expressed by tags and wherein each of said nodes existing in a lowest layer in said hierarchical tree structure corresponds to each piece of said unit data and to each of said tags expressing each of said nodes in said lowest layer are added identifying information used to identify each piece of said unit data and time information indicating a time of storing each piece of said unit data into said memory, and wherein each of said information processing devices includes a replication control unit which, by using said identifying information and said time information, detects inconsistent portion of said data held by each of said information processing devices and performs replication of said inconsistent portion of said data only between said information processing devices.

2. The information processing system according to claim 1, wherein said identifying information has an identification code used to identify each of said information processing devices.

3. The information processing system according to claim 1, wherein at least one of said plurality of information processing devices is a server and at least one of said plurality of information processing devices except said server is a mobile device being a client and wherein replication of information is performed between said server and said mobile device.

4. The information processing system according to claim 3, wherein said network is a Wide Area Network.

5. The information processing system according to claim 3, wherein said mobile device, by using said identifying code fed from said server through said network and used to identify said mobile device, is able to produce new identifying information even while said mobile device is not being connected to said network.

6. The information processing system according to claim 1, wherein each of said information processing devices is a server operating on said network.

7. The information processing system according to claim 1, wherein said time information is made up of a synchronized time attribute indicating a time of completion of said replication of information between said information processing devices and of a changed time attribute indicating an updated time of storing each piece of said unit data into said memory.

8. The information processing system according to claim 1, wherein a set attribute indicating a set to which each piece of said unit data belongs is added to said tag of said node in the lowest layer.

9. The information processing system according to claim 8, wherein each of said information processing devices is able to designate a predetermined group of unit data using said set attribute.

10. The information processing system according to claim 7, wherein a priority attribute showing information about priority as to whether said unit data to be updated is to be overwritten with unit data to be replicated at time of said replication is added to said tag of said node in the lowest layer.

11. The information processing system according to claim 10, wherein one of said information processing devices storing said unit data to be updated judges, when said changed time attribute given to said tag corresponding to said unit data to be updated shows a time being newer than a time shown by said synchronized time attribute given to said tag at time of said replication, whether said unit data to be updated is to be overwritten by said unit data to be replicated on the basis of said priority attribute given to each of said both unit data.

12. The information processing system according to claim 11, wherein, when said unit data to be updated has not been overwritten with said unit data to be replicated according to said judgment based on said priority attribute, an event notification showing that said replication between said information processing devices has become invalid is issued to said information processing device storing said unit data to be replicated.

* * * * *